Oct. 3, 1961

E. V. KIRKLAND ET AL 3,002,897

DISTILLING HEAD

Filed Dec. 10, 1957

Inventors
Earl V. Kirkland
Harry G. Brinkley, Jr.
By Everett A. Johnson
Attorney

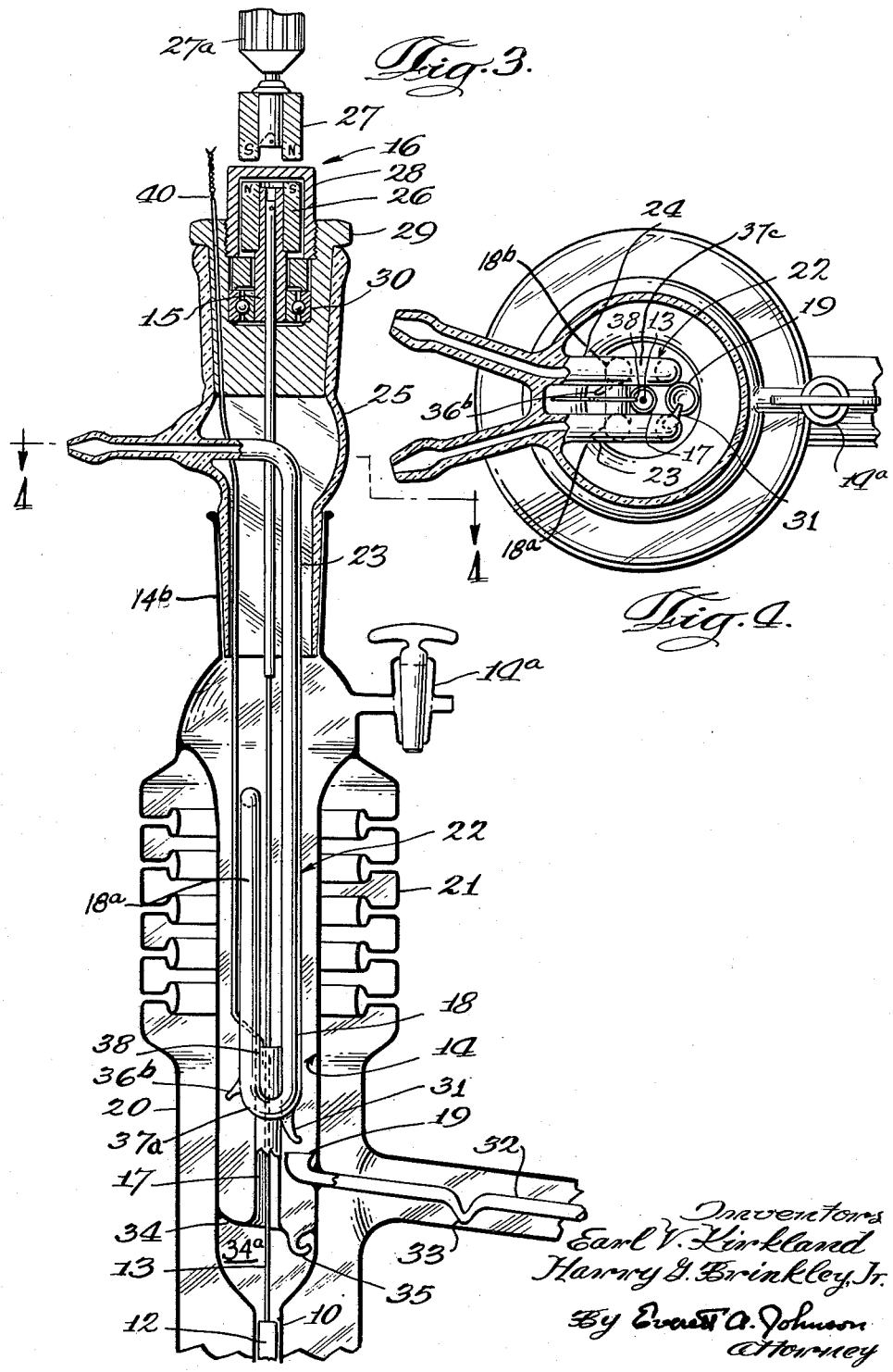

3,002,897
DISTILLING HEAD
Earl V. Kirkland, La Marque, and Harry G. Brinkley, Jr., Texas City, Tex., assignors, by mesne assignments, to Standard Oil Company, Chicago, Ill., a corporation of Indiana
Filed Dec. 10, 1957, Ser. No. 701,838
4 Claims. (Cl. 202—161)

This invention relates to a still head for fractionating columns adapted to make precision distillations.

The need for fractional distillation of small quantities of organic liquids has increased with the trend in research for small scale experiments. Miniature distillation columns have been designed which give separations of 15 to 50 ml. samples equal to those obtainable with large samples on macro high efficiency laboratory columns. However effective miniature distillation requires more than just scaling down a large column. On smaller scale, control of throughput and reflux ratio must be more precise. Losses of samples must be avoided and entrainment of vapors during vacuum operation must be eliminated.

With large scale equipment such as used in refineries and chemical plants, reflux is accurately controlled manually. However with smaller columns, such as used in pilot plants and in the laboratory accurate control of reflux becomes more difficult because of the relatively small amounts of liquid that must be accurately metered. Furthermore in pilot plant work and laboratory fractionations, accurate reflux control is often essential. As the size of the equipment decreases the difficulty in controlling the reflux increases.

Many laboratory still heads have been designed with manually operated means of various types for controlling reflux. Such manual heads require constant attention and adjustment. Accordingly automatic reflux control is widely used since continuous adjustment is not necessary. However such automatic controllers are essentially intermittent dividers (i.e. total reflux for a given time and total take-off for a given time) and often are not adaptable for micro and semi micro fractionations because of the large time intervals involved. For example, with some micro columns the drop time (i.e. time between formation of each condensate drop) may be 3 to 6 seconds, and the total reflux part of the cycle is excessive at high reflux ratios.

Many automatic reflux control systems employ magnetic devices requiring auxilliary electric equipment such as magnets, timers, etc. Such automatic heads have many deficiencies. Hot vapors rising from the column contact glass joints and the take-off cup. Contact of hot vapors with lubricated glass joints is a source of product contamination and such contact often results in frozen joints due to removal of lubricant and solidification of product in the joint. On the other hand when the hot vapors flow over the product take-off cup, the product flowing into the receiver is hot. Furthermore some of the hot vapors condense on the take-off cup and this causes the reflux ratio to vary with the temperature of the take-off cup. As a result some product flows down the product line without having reached the dividing condenser. For example, when operating at total reflux, vapors may condense in the take-off line and pass into the receiver rather than back into the column. This problem has heretofore necessitated a stopcock in the take-off line which as mentioned above is a source of contamination and operating difficulties.

It is therefore a primary object of our invention to provide an apparatus which has no moving parts, has no joints or seals in contact with hot vapors, requires no auxiliary control equipment, and is applicable to vacuum or pressure operation with heterogenous and homogenous systems. A further object is to provide an apparatus wherein reflux is accurately controlled at variable boil-up rates and wherein cooling, other than the main condenser, is not required. A further object of the invention is to provide a still head for fractionating columns wherein the condensed product is not contacted with hot vapors. A more particular object of the invention is to provide a system which is useful for macro, micro, or semi-micro operations while avoiding the difficulties and deficiencies of the system heretofore proposed. These and other objects of the invention will become apparent as our description thereof proceeds.

Briefly, according to our invention the still head is constructed so that hot vapors pass from the column directly to the condenser surface, which is placed between the hot vapors and the product cup and line. This may be accomplished by providing a vapor riser between the column and the condenser section to direct the hot vapors onto the upper surfaces of the condenser.

The diameter of the vapor riser should be large enough for the vapors to pass through without excessive resistance and may be from about one-half to about twice the diameter of the column. The riser should be of such a length as to project a substantial distance into the condenser section with its outlet above the take-off cup.

The condenser comprises a plurality of vertical segments in a bundle, one or more segments having a common drip tip and the bundle being rotatable within the head to position a selected drip tip over the product take-off. The liquid condensate flows to the lower portion of the condenser surfaces and is divided, part returning to the column from a pan supporting the riser and part flowing from the apparatus through the product line.

The product line is trapped and vacuum jacketed. The collection-reflux pan supporting the vapor riser extends across the entire flow area of the condenser section and is provided with a trapped outlet which discharges above the column, preferably in approximate alignment with the axis of the column and vapor riser.

Further advantages and the details of construction of our apparatus will be described by reference to the accompanying drawings wherein:

FIGURE 3 is an elevation partly in section showing a distilling head according to our invention adapted for use on a spinning band column; and FIGURE 4 is a view taken along the line 4—4 in FIGURE 3.

Figures 1, 2:
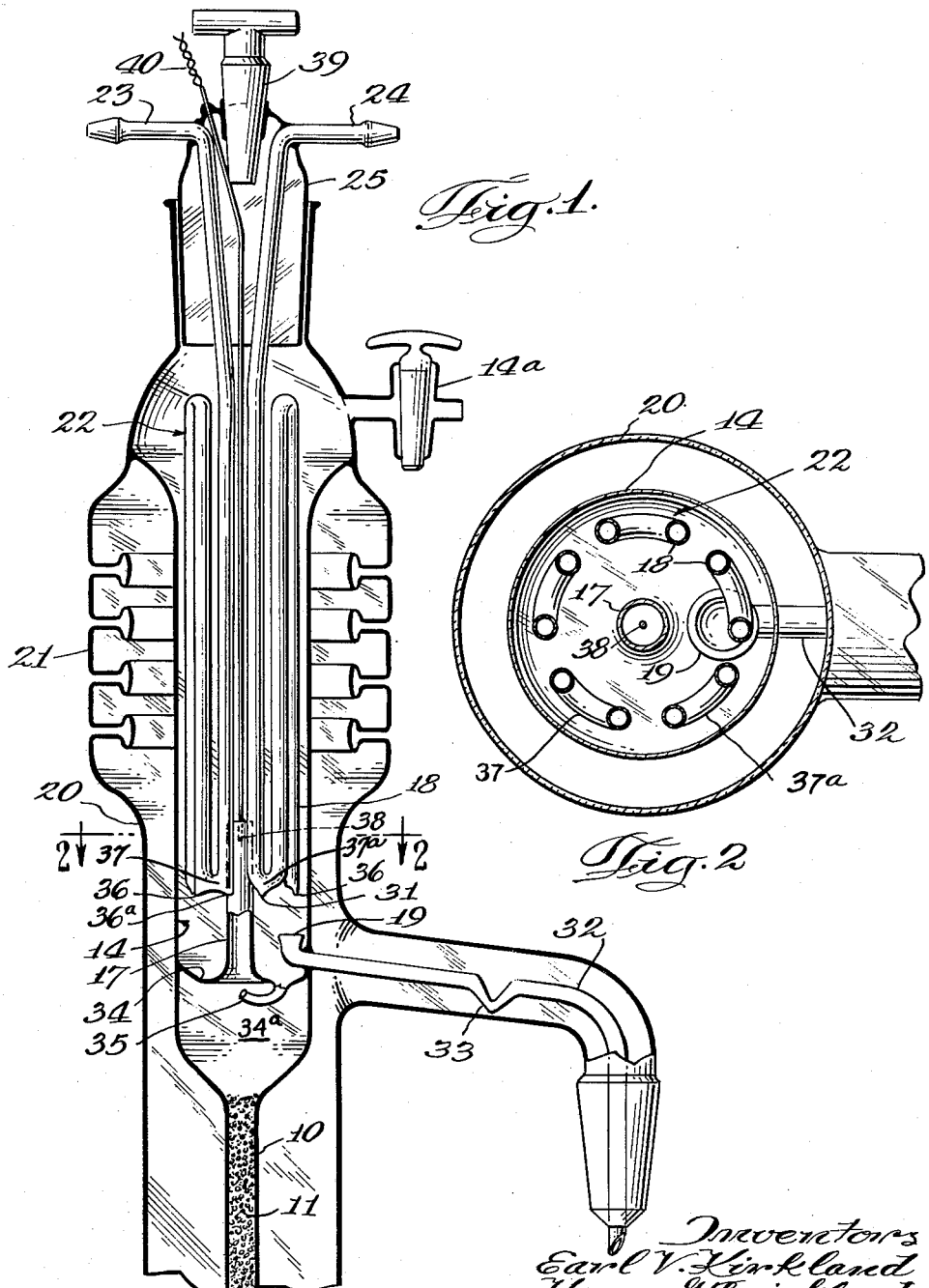
FIGURE 1 is an elevation, partly in section of one embodiment of the invention.
FIGURE 2 is a section taken along the line 2—2 in FIGURE 1.

Referring to the drawings a column 10 comprising a relatively long thin glass tube contains the packing 11 (FIGURE 1) or the spinning band 12 (FIGURE 3) having a drive shaft 13 which extends through the head 14 (about 40 mm. I.D. and 200 mm. long) and is secured to the drive pin 15 within the magnetic coupling 16 (FIGURE 3). A still pot (not shown) supplies hot vapors to the column 10.

The hot vapors pass upwardly from the column 10, through the vapor riser 17 (about 10 mm. I.D. and about 50 mm. high) and onto the condenser tubes 18 at a point about 40 mm. above the product cup 19. One wall of the vacuum jacket 20 about the column 10 comprises expansion bellows 21. The head 14 is shown as connected to the column 10. However it may be separable from the column 10 and connected thereto with standard tapered joints or other suitable connectors not affected by the hot vapor. When still head 14 is separable from the jacketed column the bellows 21 in the jacket 20 about the head 14 may be omitted.

In FIGURE 1 the condenser-condensate divider comprises a bundle 22 of vertical tubes 18 (about 6 mm. O.D. and about 150 mm. long) arranged in a circular pattern around the vapor riser 17 and connected in series. The two ends 23 and 24 of the tube bundle 22 extend upwardly and are sealed through the rotatable top cap 25. Water is introduced into one end 23 of the tube bundle 22 and withdrawn from the other end 24. Thus, a portion of the hot vapors from column 10 condense on each of the vertical condenser tubes 18 and flows to the bottom of the particular condenser tube 18 remote from the direct flow of hot vapors discharging from vapor riser 17.

Referring to FIGURE 3, the spinning band 12 is magnetically driven. The drive coupling 16 includes a pair of opposed magnets 26 and 27 arranged axially of each other and of the shaft 13. The magnet 27 is secured and driven by chuck means 27a and the drive magnet 26 is within a vacuum-tight and non-magnetic housing 28. The housing 28 is supported by the cap 25 by means of tapered joint 29 in the upper end thereof. The lower end of cap 25 is supported at the upper end of head 14 by means of tapered joint 14b. The elongated drive pin 15 disposed within the housing 28 is arranged to be rotated by the enclosed drive magnet 26. An anti-friction bearing means 30 rotatably supports the drive pin 15 which drives the rotatable element or band 12 through the band shaft 13. A magnetic coupling of this type is further described in U.S. 2,783,401 entitled "Seal and Magnetic Drive" to which reference may be made for further details.

Drip tip 31 at the bend 37a in the bottom of two of the tubes 18 directs the condensate from both tubes into the product cup 19 to flow into a receiver (not shown) by way of take-off line 32 provided with liquid trap 33, the balance of the condensate flowing onto a plate 34 across head 14 and supporting the vapor riser 17 from which the condensate flows back into the column 10 through trapped reflux drain line 35 discharging into sub-chamber 34a with the head 14.

Several choices of reflux ratios can be built into the rotatable condenser 22. If a total of ten tubes 18 is used in the condenser 22, the condensate from two of the tubes 18 having one drip tip 31 is ⅕ the total condensate providing a reflux ratio of 4:1. If two drip tips 36 and 36a are provided on the connecting bend 37 of two vertical tubes 18, the reflux ratio is 9:1. If a total of four tubes 18 is used and drip tip 36b is attached to vertical tube 18b (in the tube bundle 22 comprising four vertical tubes) at a point substantially above the lower terminal end of the tube 18b, then the reflux ratio is 3:1. Additional selections of reflux ratios can be incorporated by using more or less than ten vertical tubes 18 or by combining the condensate from a group of three or more tubes 18 by providing a single drip tip for such group.

Vapor temperature in the vapor riser 17 is measured by a thermocouple 38, the leads to which pass through the rotatable top cap 25 supporting the condenser 22. In FIGURE 3, the thermocouple leads 40 pass through the housing 29. In any event, the temperature-sensitive element, such as the junction of thermocouple 38 or bulb of a thermometer (not shown) is best placed within the top of the vapor riser 17. If a thermometer is used, it may be introduced through the stoppered port 39.

In the embodiments illustrated in the drawing, we provide two liquid traps 33 and 35. One trap 35 is a bent tube connected to the bottom of the collection plate 34 through which liquid reflux returns to the column 10. This trap is necessary for successful operation of the head 14 since it prevents the bypassing of vapor around the vapor riser 17. The liquid retained by this trap 35 is about the volume of an average drop, i.e. about 0.05 cc.

The second trap 33 is a bend in the product line 32 made of 1 mm. capillary tubing. Essentially no vapors enter the product line 32, however, the total liquid hold-up of our still head 14 with the two traps 33 and 35 is about 0.1 cc.

The distilling head described above and in the drawings assures that no hot vapors reach the product line 32 or the product cup 19. To prove this feature we have operated our apparatus by turning the condenser bundle 22 so that all of the condensate dripped onto the collector plate 34 and none into the product cup 19. After 16 hours reflux with n-heptane there was no liquid in the product receiver.

From the above it will be apparent that we have attained the objects of our invention and have provided a superior still head adapted for use on packed columns (FIGURE 1) and on spinning band columns (FIGURE 3). Tap 14a is provided for vacuum operations if desired.

Although the invention has been described with reference to preferred embodiments thereof, it is to be understood that these are by way of illustration only. Accordingly, it is contemplated that modifications and variations can be made in the apparatus by those skilled in the art in light of our description and without departing from the spirit of the invention.

What we claim is:

1. A distilling head comprising an elongated chamber, condenser means arranged peripherally within said chamber, product condensate delivery means associated with said condenser means and adapted to be positioned selectively over a product take-off means for controllably varying the reflux ratio, said product take-off means being positioned within said chamber and below said delivery means, reflux collection means below said product take-off means and extending substantially across the flow area of said chamber and defining a sub-chamber therebelow, drain conduit means discharging reflux below said collection means into said sub-chamber, vapor riser means carried by and extending upwardly from said reflux collection means and discharging within said condenser means above said delivery means and said take-off means.

2. The distilling head of claim 1 wherein said condenser means is a segmented condenser means having a plurality of vertical segments and said condensate delivery means comprises a plurality of condensate delivery tips associated with the lower ends of segments of said condenser means and adapted to be rotatably positioned over said take-off means whereby condensate from selected segments of said condenser means may be delivered to said take-off means and to said reflux collection means.

3. The distilling head of claim 1 wherein said drain conduit means comprises a liquid-trapped tube discharge means connected to the bottom of said collection means and preventing bypassing of vapor around the vapor riser means.

4. The distilling head of claim 1 wherein a vapor inlet means is attached below said sub-chamber and said sub-chamber comprises a chamber of enlarged diameter relative to said vapor inlet means.

References Cited in the file of this patent

UNITED STATES PATENTS

| | | |
|---|---|---|
| 2,251,185 | Carter et al. | July 29, 1941 |
| 2,427,142 | Hornbacher et al. | Sept. 9, 1947 |
| 2,476,477 | Berg | July 19, 1949 |
| 2,537,942 | Martin | Jan. 9, 1951 |
| 2,538,957 | Askevold et al. | Jan. 23, 1951 |
| 2,601,971 | Todd | July 1, 1952 |
| 2,764,534 | Nerheim | Sept. 25, 1956 |

UNITED STATES PATENT OFFICE
CERTIFICATE OF CORRECTION

Patent No. 3,002,897                                October 3, 1961

Earl V. Kirkland et al.

It is hereby certified that error appears in the above numbered patent requiring correction and that the said Letters Patent should read as corrected below.

Column 3, line 39, for "with" read -- within --; column 4, line 30, strike out "product".

Signed and sealed this 10th day of April 1962.

(SEAL)
Attest:

ERNEST W. SWIDER                          DAVID L. LADD
Attesting Officer                            Commissioner of Patents